April 9, 1957 H. R. McDANIEL 2,787,881
ROTARY BLADE ASSEMBLY FOR POWER LAWN MOWER
Filed Oct. 20, 1952 2 Sheets-Sheet 1

INVENTOR
HENRY R. McDANIEL.

BY *Gustave Miller*
ATTORNEY

April 9, 1957 H. R. McDANIEL 2,787,881
ROTARY BLADE ASSEMBLY FOR POWER LAWN MOWER
Filed Oct. 20, 1952 2 Sheets-Sheet 2
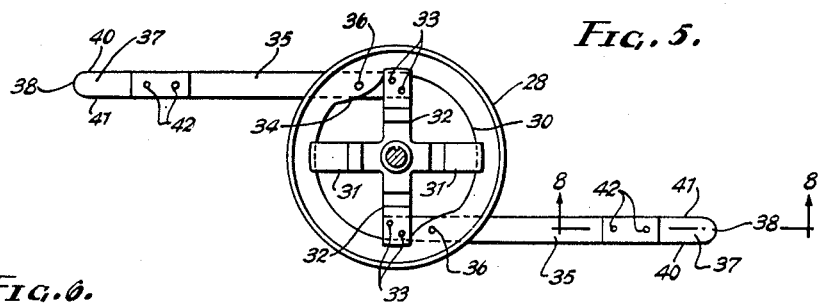
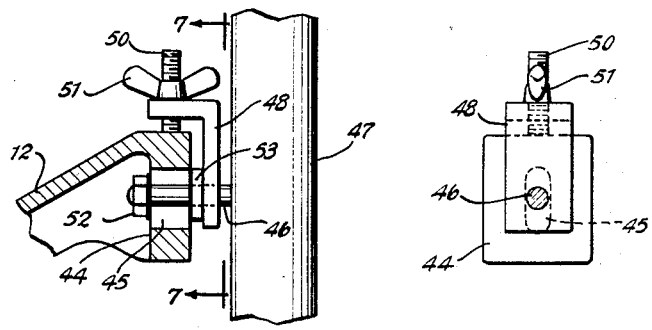
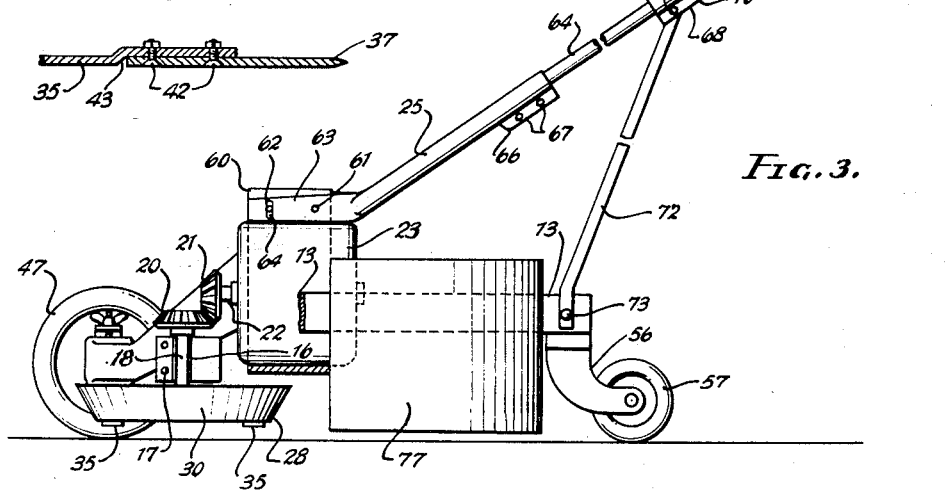
INVENTOR
HENRY R. McDANIEL.
BY *Gustav Miller*
ATTORNEY United States Patent Office 2,787,881
Patented Apr. 9, 1957

2,787,881

ROTARY BLADE ASSEMBLY FOR POWER LAWN MOWER

Henry R. McDaniel, Houston, Tex.

Application October 20, 1952, Serial No. 315,680

1 Claim. (Cl. 56—295)

This invention relates to a power lawn mower and has for an object to provide an improved power lawn mower of the type which employs a pair of power-driven blades revolving in a plane parallel to the ground.

A further object of this invention is to provide an improved power lawn mower adjustable for use in connection with an electric motor or an explosion-operated or expansion-operated motor, such as gasoline, diesel, or steam.

Still a further object of this invention is to provide an improved power lawn mower having a rotatable blade means, revolving in a plane parallel to the ground, the height of the plane of revolution of the blades being readily adjustable as desired.

Still a further object of this invention is to provide a blade arm for a power-driven lawn mower wherein a blade is detachably secured thereto, and has two sharpened edges, one of which is used at a time, and the other of which is in reserve and may be placed in operation when the first edge is dulled by merely removing it from the arm, turning it over, and re-attaching it.

Still a further object of this invention is to provide a blade guard located in the plane of the revolving blade for protecting the operator at the rear thereof.

Still another object of this invention is to provide a power lawn mower which is comparatively inexpensive to manufacture and may be sold at a reasonable cost.

With the foregoing and other objects in view, this invention comprises the combinations, constructions and arrangements of parts hereinafter set forth, claimed and disclosed in the accompanying drawing, wherein—

Fig. 3 is a side plan view partly in section.

Fig. 5 is a detailed view of the blade and blade holding means.

Fig. 6 is a partly sectional view of a fragment showing the wheel axle adjusting means.

Fig. 7 is a sectional view on line 7—7 of Fig. 6.

Fig. 8 is a fragmentary detail of the blade mounting.

Figure 1:
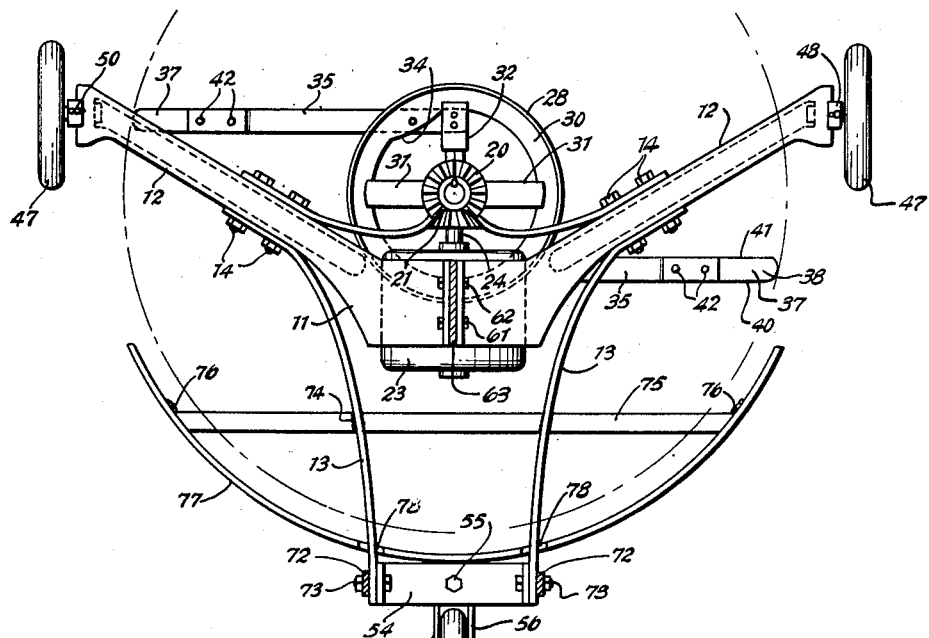
Fig. 1 is a top plan view of the invention, the handle and handle braces being sectioned off.
Figure 2:
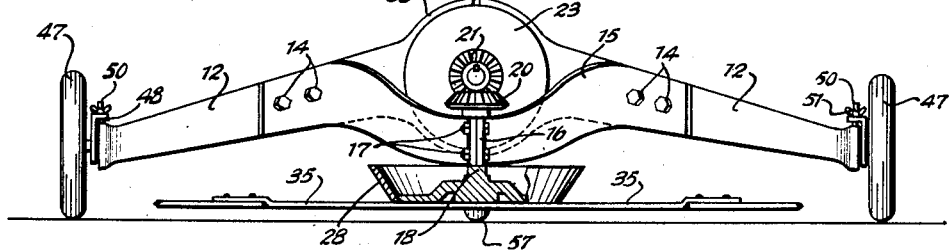
Fig. 2 is a partly sectional, partly broken away view, showing the front wheel mechanism and adjusting means.
Figure 4:
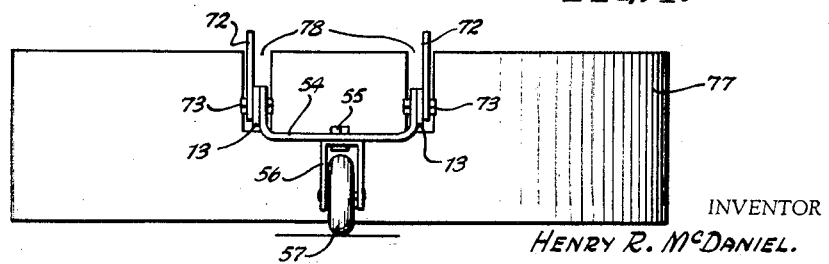
Fig. 4 is a detailed rear view showing the blade guard and castor wheel.

There is shown at 10 the power lawn mower of this invention, which consists of a frame base 11 having a pair of extending axle arms 12 of substantially inverted U shape in cross section. Such axle arms 12 form a Y with a pair of rearwardly extending curved side plates 13 bolted thereto at 14. The same bolts 14 also serve to secure and support forwardly extending angular curved plates 15 to which are secured a vertical shaft housing 16 by means of bolts 17. Journaled in the vertical shaft housing 16 is a vertical shaft 18 having a beveled gear 20 at the top thereof in mesh with a beveled gear 21 on the end of a power shaft 22 from the power motor 23.

The power motor 23 may be of any conventional type having any suitable conventional control means.

Secured to the bottom of shaft 18 is a blade flywheel 28, having its felly 30 attached to the shaft 18 by radially extending spokes 31 and 32. It will be noted that the felly 32 of the flywheel 28 is of inverted frustoconical shape for added strength. Secured to the opposite ends of the radial spokes 32 by studs or rivets 33 and also to bosses 34 extending from felly 30 is a pair of oppositely disposed parallel cutter arms 35. The two cutter arms 35 are thus located in a tangent to the bottom of the felly 30 of the flywheel 28 and have a three-point rigid attachment thereto, including the rivets or studs 36 through the boss 34. On the end of each cutter arm 35 there is secured a cutter blade 37, having a rounded end 38 and two oppositely disposed cutting edges 40 and 41. The blades 37 are mounted on the cutter arms 35 by means of removable stud screws 42 so that when one cutting edge, as 40 for instance, becomes dulled, the blade 37 may be removed, turned over, and re-attached, placing the cutting edge 41 in operating position, thus enabling the lawn mower to be used twice as long between sharpenings. It will be noted that the cutter arm 35 is offset to support the blade 37 as shown at 43 in Fig. 8.

The ends of the axle arms 12 are provided with vertical webs 44, each web 44 having a vertically extending slot 45 through which is adjustably secured an axle shaft 46 for the front wheel 47. This axle shaft 46 may be adjusted within the slot 45 by means of an adjusting bell crank 48, which has one arm secured about the axle shaft 46 and has an aperture in its other arm, extending over a screw 50 secured in the top of the web 44 and provided with a wing nut 51, whereby tightening the wing nut downwardly raises the axle arm 12 relative to the axle shaft 46. After the axle shaft 46 has thus been adjusted to provide the proper height for the plane of the blades 37, the shaft 46 may be secured in the adjusted position by tightening the axle nut 52 thereon against one side of the web 44 and axle bead 53, integrally mounted on the axle shaft 46 between the web 44 and the bell crank 48.

Secured between the rearward ends of the curved side plates 13 is an inverted U-shaped wheel plate 54, to the center of which is pivoted by means of a bolt and nut 55 the castor fork 56 for rear castor wheel 57.

The motor 23 is mounted within a housing 58 secured on the frame base 11 between the axle arms 12 and having clamping flanges 60 secured by bolts 61 and 62. Secured between these flanges 60 by means of the same bolts 61 and 62 is the flattened bottom end 63 of the handle sleeve 25, the flattened end 63 having a bolt aperture for the bolt 61 and a slot 59 for cooperation with the bolt 62, permitting an adjustment of the angle of the sleeve 25. Extending from the handle sleeve 25 is a hollow rod 64, which also extends into the handle grip sleeve 65. The hollow rod 64 is adjustably secured in the handle sleeve 25 by means of a split end on the sleeve 25, having flanges 66 tightened by studs 67. The handle grip sleeve 65 has a similar split end with similar flanges 68 and tightening studs 70 and 71. However, the split in the sleeve 65 is sufficiently wide so that the ends of the two handle braces 72 may be secured therebetween by means of the stud 71. The other ends of the handle braces 72 spread apart to form a yoke, which is secured to the opposite ends of the U-shaped wheel plate 54 by securing bolts 73 which also pass through the ends of the curved side plates 13.

Also secured to the curved side plates 13 by welding or other suitable means, as shown at 74, is a cross bar 75, to which is welded or secured at 76 the quarter circle shaped cutter guard 77, this cutter guard 77 being slotted at 78 so that it may extend from the plane of the cutter blade to above the plane of the curved side plates 13.

In operation, the motor 23, which may be an electric motor or a gas-powered or expansion type motor, has its control member extending through and concealed within the hollow sleeve 25, the hollow rod 64 and the hollow handle grip sleeve 65 and connected to the motor control 26. The height of the plane of the rotating blades 37 may be adjusted by loosening the axle nut 52, adjusting the wing nut 51 and then tightening the axle nut 52. Then, as thus adjusted, the lawn mower is merely wheeled over the lawn by means of the hand grip 67, controlling the motor by means of the motor control 26. The cutter blades 37 will be rotated at a high speed as a result of which the length of the cutter blade 37 is sufficient as shown, because of the fact that the high speed rotation thereof will bring the following cutter blade into cutting position before the whole lawn mower, pushed at normal walking speed, will have advanced any further than the length of the blade. With the blade rotating at such high speed, it would cut through the grass whether short or long without difficulty, for the grass will not have time to bend away from the blade, due to its high speed.

While the preferred form of this invention has been shown and described, it will be understood that this invention is not restricted to the particular details of construction and arrangement hereinbefore set forth, but that changes in such details and construction may be made within the scope of what is hereinafter claimed.

Having thus set forth and disclosed the nature of this invention, what is claimed is:

A cutter for a power mower which includes a vertical power shaft, said cutter comprising a flywheel mounted on the bottom of said vertical power shaft, said flywheel including an inverted frusto-cone-shaped felly and radial spokes within said felly connecting said felly to said vertical power shaft, oppositely disposed cutter arms mounted at the opposite ends of at least two opposite radially extended spokes, said cutter arms extending tangentially to the bottom of said flywheel felly in parallel but oppositely disposed relation, the ends of said cutter arms being vertically offset, a cutter blade detachably and reversibly secured to each said offset cutter arm, the opposite edges of said cutter blade being sharpened, the end of each of said cutter blade being rounded.

References Cited in the file of this patent
UNITED STATES PATENTS

| | | |
|---|---|---|
| 183,857 | Laauwe | Oct. 31, 1876 |
| 1,054,256 | Taylor | Feb. 25, 1913 |
| 1,622,611 | Sera | Mar. 29, 1927 |
| 1,876,504 | Rossiter et al. | Sept. 6, 1932 |
| 2,517,405 | Moss | Aug. 1, 1950 |
| 2,529,797 | Cauble | Nov. 14, 1950 |
| 2,568,822 | Pervis | Sept. 25, 1951 |
| 2,671,299 | Orr | Mar. 9, 1954 |